US006650695B1

United States Patent
Girard

(12) United States Patent
(10) Patent No.: US 6,650,695 B1
(45) Date of Patent: Nov. 18, 2003

(54) WIRELESS DIGITAL DATA TRANSMISSION FROM A PASSIVE TRANSCEIVER

(75) Inventor: Luke B. Girard, Santa Clara, CA (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/368,031

(22) Filed: Aug. 3, 1999

(51) Int. Cl.[7] .............................. H04L 5/16; G01S 13/08
(52) U.S. Cl. ......................................... 375/219; 342/51
(58) Field of Search ............................... 340/447, 572.1, 340/10.1; 342/42; 329/304

(56) References Cited

U.S. PATENT DOCUMENTS

| 3,911,434 | A | * | 10/1975 | Cook | 340/447 |
|---|---|---|---|---|---|
| 4,075,632 | A | * | 2/1978 | Baldwin et al. | 342/51 |
| 4,850,036 | A | * | 7/1989 | Smith | 455/502 |
| 5,455,575 | A | * | 10/1995 | Schuermann | 342/42 |
| 5,649,295 | A | * | 7/1997 | Shober et al. | 340/10.1 |
| 5,825,329 | A | * | 10/1998 | Veghte et al. | 340/572.1 |
| 5,940,006 | A | * | 8/1999 | MacLellan et al. | 340/10.1 |
| 6,060,815 | A | * | 5/2000 | Nysen | 310/318 |
| 6,122,329 | A | * | 9/2000 | Zai et al. | 342/42 |
| 6,289,209 | B1 | * | 9/2001 | Wood, Jr. | 455/277.1 |
| 6,366,622 | B1 | * | 4/2002 | Brown et al. | 329/304 |
| 6,385,190 | B1 | * | 5/2002 | Malkamaki et al. | 370/347 |
| 6,466,634 | B1 | * | 10/2002 | O'Toole et al. | 375/374 |
| 2001/0054959 | A1 | * | 12/2001 | Horn et al. | 342/42 |
| 2001/0055965 | A1 | * | 12/2001 | Delp et al. | 342/42 |
| 2002/0057191 | A1 | * | 5/2002 | Bates et al. | 340/10.1 |
| 2002/0128052 | A1 | * | 9/2002 | Neagley et al. | 455/575 |

OTHER PUBLICATIONS

Micron brochure, "MicroStamp Engine™ SOIC," Modulated Backscatter (MBS) Version Data Sheet, MSEM256X10SG, Micron Communications, Inc., Boise, Idaho, Copyright 1998, MSI 1003.03, Feb. 20, 1998, 2 pages.

* cited by examiner

Primary Examiner—Stephen Chin
Assistant Examiner—Lawrence Williams
(74) Attorney, Agent, or Firm—Fish & Richardson P.C.

(57) ABSTRACT

A wireless network transmits digital data. The network includes an active transceiver to transmit carrier waves at a succession of preselected frequencies and a transponder. The transponder transmits digital data to the active transceiver by partially reflecting the carrier waves.

26 Claims, 3 Drawing Sheets

WIRELESS DIGITAL DATA TRANSMISSION FROM A PASSIVE TRANSCEIVER

BACKGROUND OF THE INVENTION

This invention relates to wireless digital data transmission.

Typical wireless digital data communication is affected between radio-frequency (RF) active transceivers contained in each of two communication devices. Each RF transceiver has a separate power source to produce the radio-frequency carrier waves used to transmit data to the other devices.

SUMMARY OF THE INVENTION

In a first aspect, the invention provides a wireless network for transmitting digital data. The network includes an active transceiver to transmit carrier waves at a succession of preselected frequencies and a transponder. The transponder transmits digital data to the active transceiver by partially reflecting the carrier waves.

In a second aspect, the invention provides a transceiver for digital data. The transceiver includes an antenna to transmit radio-frequency (RF) carrier waves and an RF module coupled to drive the antenna to produce the RF carrier waves. The RF module detects reflected portions of the produced RF carrier waves at the same time. The RF carrier waves have a succession of frequencies.

In a third aspect, the invention provides a method for wireless data transmission. The method includes transmitting radio-frequency (RF) carrier waves to a transponder at a succession of frequencies and receiving reflected portions of the RF carrier waves from the transponder. The reflected portions are digitally modulated.

In a fourth aspect, the invention provides a method of wireless digital communication. The method includes receiving a first radio-frequency (RF) carrier wave at a receiver, digitally modulating an RF reflectivity of the receiver, and reflecting a portion of the first RF carrier wave in response to the digitally modulating of the RF reflectivity. The method includes repeating the receiving, digitally modulating, and reflecting for a second RF carrier wave at a new frequency.

Other features and advantages of the invention will be apparent from the following description and from the claims.

DETAILED DESCRIPTION

Figure 1:
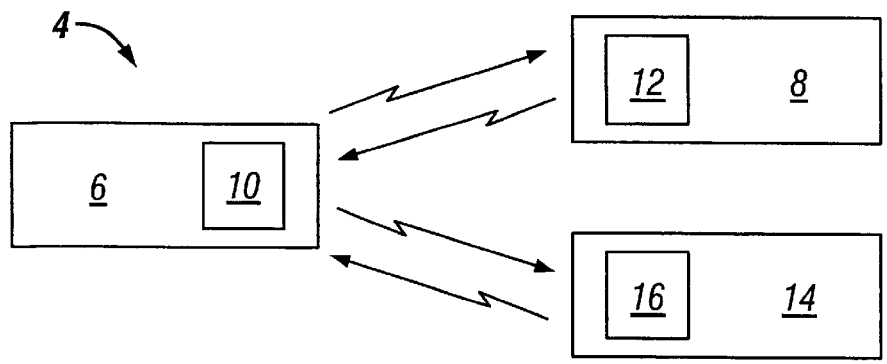
FIG. 1 shows an embodiment of a wireless network for digital data exchanges.

FIG. 1 shows a local wireless radio-frequency (RF) network 4 for transmitting digital data between a digital device 6 capable of communicating data and other digital devices 8, 14 capable of communicating data. The digital device 6 contains an interrogator 10, which controls communications between digital device 6 and the other devices 8, 14. Each of the other devices 8, 14 includes a passive transponder 12, 16. The interrogator 10 is a master of wireless communication over the passive transponders 12, 16, which are communication slaves.

Though the transponders 12, 16 are communications slaves of the interrogator 10, devices 8, 14 may control some functions of the digital device 6 through the wireless network 4. The wireless network 4 supports half duplex communications of digital data between any of the transponders 12, 16 and the interrogator 10.

The interrogator 10 is an active radio-frequency (RF) transceiver of digital data. The active transceiver can transmit digital data to the transponders 12, 16 on an RF carrier wave, e.g., using differential phase shift keying (DPSK) modulation. The interrogator 10 can also selectively receive digital data from an RF carrier wave that has been modulated through DPSK by one of the transponders 12, 16. Though the transponders 12, 16 can both transmit data to and receive data from the interrogator 10, the transponders 12, 16 are not the source of the RF carrier waves used to transmit digital data to the interrogator 10.

Instead, the transponders 12, 16 transmit digital data by passively reflecting a portion of an unmodulated RF carrier wave, which was transmitted by the interrogator 10. The digital data appears as a DPSK modulation on the back reflected portion of the carrier wave. The DPSK modulation is produced by changing the transmitting transponder 12, 16 between RF reflective and non-reflective states. DPSK may be a convenient modulation scheme, because the transponders 12, 16 transmit data through passive reflection. The interrogator 10 receives a portion of the back reflected RF carrier wave and demodulates the received portion to retrieve the digital data sent by the transmitting transponder 12, 16.

Since the transponders 12, 16 do not produce the RF carrier wave used to transmit data, they can operate with lower power sources than active RF transceivers. The transponders 12, 16 may use small, inexpensive, and light "buttons" batteries 13 or solar cells 17 as power sources, because they do not have to generate the RF carrier waves. Some embodiments of the transponders 12, 16 can even extract enough energy from the received RF carrier waves, to power their internal circuits (not shown).

Small and lightweight power sources make the transponders 12, 16 convenient for use in embodiments of the devices 8, 14, which have special functionalities. For example, the devices 8, 14 may be personal identity badges, cellular phones, pagers, personal digital assistants, notebook computers, keyboards, or computer mice. The devices 6, 8, 14 may also be heavier objects such as printers and facsimile machines.

Figure 2A:
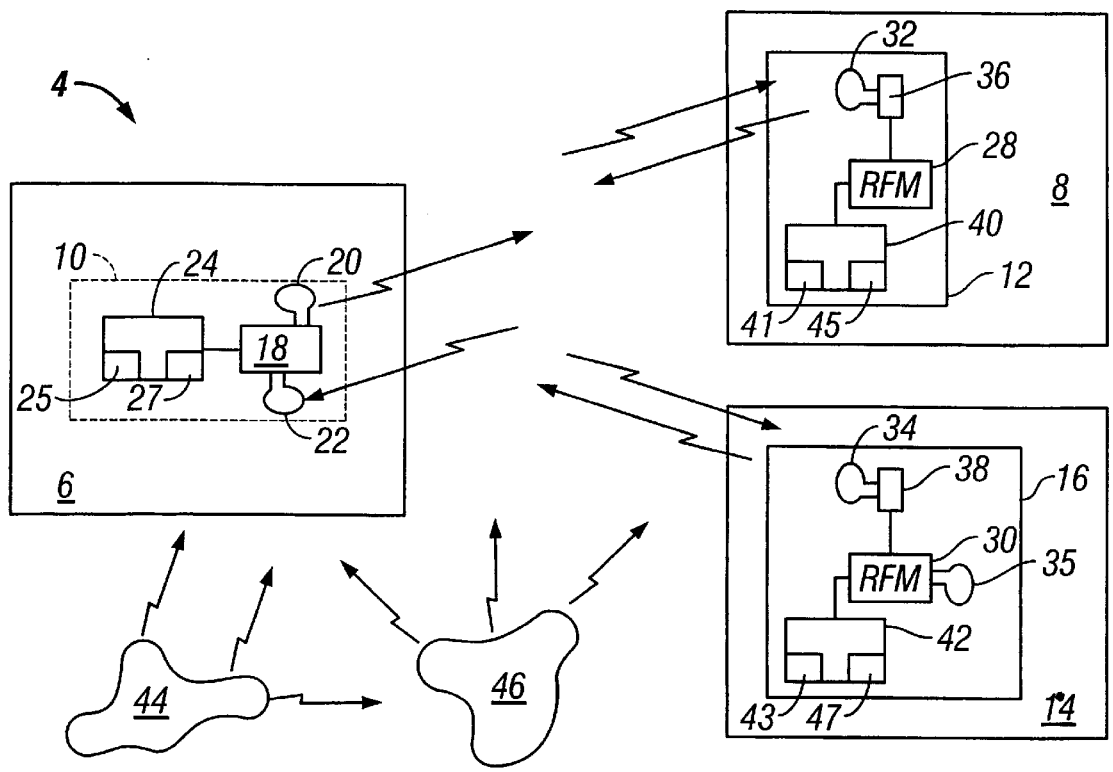
FIG. 2A shows transceivers of the wireless network of FIG. 1.

Referring now to FIG. 2A, the interrogator 10 includes an RF module 18, transmission and reception antennae 20, 22, and a processor 24. The RF module 18 generates a variable frequency voltage for driving the antenna 20 to generate RF carrier waves. The RF module 18 also provides for variable frequency filtering of RF radiation received by the antenna 22. The processor 24 contains logic for controlling the RF module 18 during signal transmission and reception. The processor 24 contains memory 25 and logic elements 27 and may perform more complex activities, e.g., database look ups, calculations, printing.

Some embodiments of the interrogator 10 use the same antenna for both transmitting and receiving RF signals Each transponder 12, 16 includes an RF module 28, 30, an antenna 32, 34, a switch 36, 38, and a processor 40, 42. The RF modules 28, 30 control data transmission modes of the associated antenna 32, 34 through the associated switch 36, 38. The RF modules 28, 30 also provide variable frequency filtering of RF radiation received by the associated antenna 32, 34. The transponders 16 has separate antennas 34, 35 for transmitting data to and receiving data from the interrogator 10. The processors 40, 42 control the associated RF module 28, 30 and contain both memory 41, 43 and logic elements 45, 47 to provide for control of data transmission and reception.

The dimensions of the antennae 32, 34 provide good reflection of the RF radiation transmitted by the interrogator 10 when in a reflective state. The antennas 32, 34 have two states. In the closed state, the switch 36, 38 shorts an electrical dipole loop through the associated antenna 32, 34, i.e., forming a closed loop. The dipole loop partially back reflects RF radiation, e.g., an RF carrier wave transmitted by the interrogator 10. The interrogator 10 receives detectable amounts of back reflected RF radiation when the antennae 32, 34 are in the closed state. In the open state, the switch 36, 38 does not close an electrical dipole loop through the associated antenna 32, 34. Then, the antennae 32, 34 reflect very little RF radiation transmitted by the interrogator 10, e.g., the above-mentioned RF carrier wave. The interrogator 10 does not receive detectable amounts of back reflected RF radiation when the antennae 32, 34 are in the open state.

The switches 36, 38 function at high enough frequencies so that the transponders 12, 16 can transmit data at high bit rates. High frequency switches 36, 38 may be formed by single transistors, which series couple across the associated antenna 32, 34 to form an electrical dipole loop. The opened or closed state of the dipole loops are controlled by the associated RF module 28, 30 through a gate bias or base current of the transistor forming the switch 36, 38. Opening and closing the switches 36, 38 modulates the reflectivity of the associated transponder 12, 16 to an RF carrier wave received from the interrogator 10. Opening and closing one of the switches 36, 38 in rapid succession produces a reflected wave with a binary amplitude modulation at frequencies between tens of kilo-Hertz and about a few mega-Hertz. The modulation phase is detectable by the interrogator 10 at distances between about 10 centimeters and 10 meters and provides for digital data transmission for network 4. The detection distance depends on the transmit power level and the reception gain of the interrogator 10.

Though the RF modules 28, 30 power the switches 36, 38 and any internal logic and/or memory, they do not produce the RF carrier waves that carry data transmissions. The high energy costs for producing the RF carrier waves used for data transmissions, in both directions, are born by the interrogator 10. Thus, the RF modules 28, 30 use less power to transmit digital data than active RF transmitters (not shown). Lower power consumption to transmit data translates into lower demands on power sources.

The interrogator 10 also hops to a new RF driving frequency at regular intervals. Frequency hopping reduces interference from background RF sources 44, 46, because the background RF sources 44, 46 usually do not frequency hop. Between frequency hops, the interrogator 10 transmits an RF carrier wave in a predetermined member of a set of narrow frequency bands.

Figure 2B:
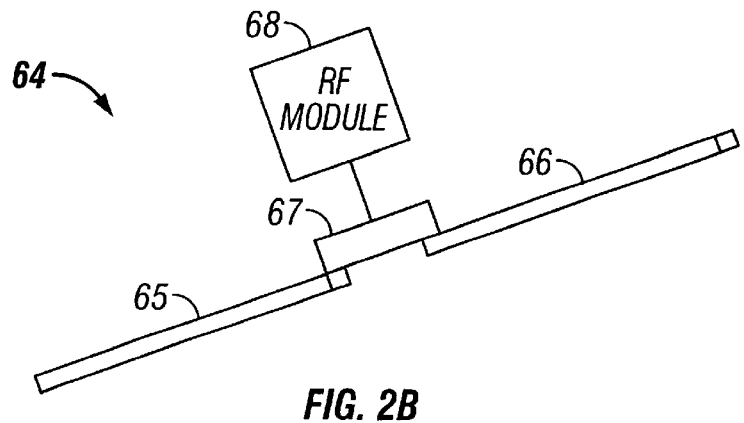
FIG. 2B shows an alternate form for the antennae of the transponders of FIGS. 1 and 2A.

FIG. 2B shows another reflective dipole antenna 64 for an alternate embodiment of the transponders 12, 16 of FIGS. 1 and 2A. The antenna 64 includes two linear segments 65, 66 positioned in a linear end-to-end arrangement. The length of each segment 65, 66 is about equal to ¼ of the wavelength of the carrier wave produced by the interrogator 10.

The reflectivity of the dipole antenna 64 is controlled by a high speed switch 67 connecting the two segments 65, 66 in a linear arrangement. An RF module 68, e.g., one of the RF modules 28, 30 of FIG. 2A, operates the switch 67. In the open state, the switch 67 is electrically open and the antenna 64 performs as two separate ¼-wavelength antennae. In the closed state, the switch 67 is closed and the antenna 64 performs as a single ½-wavelength antenna. A pair of ¼-wavelength antennae and a ½ wavelength antenna have substantially different RF reflectivities. Thus, the antenna 64 has a different reflectivity in the open and closed states.

Some embodiments of the network 4 comply with protocols of the Bluetooth Special Interest Group, www.bluetooth.com, published Jul. 16, 1999. The protocols of the Bluetooth Special Interest Group are used with spread spectrum technology transmissions occurring in 79 preselected narrow RF bands. The narrow RF bands are one mega-Hertz wide, adjacent and located in the range between about 2.402 and 2.480 giga-Hertz. In this range, the transceivers 12, 16 of FIGS. 1 and 2A can transmit about $10^{-3}$ to $10^{-1}$ watts of RF by passive reflection of a received RF carrier wave.

In the embodiments implementing the protocols of the Bluetooth Special Interest Group, the devices 6, 8, 14 hop to an adjacent narrow RF band each 80 milli-seconds. Each hop increases the transmission frequency until the upper extreme of the frequency range is reached. From the upper extreme, the devices 6, 8, 14 return to the lowest narrow RF band of the range, i.e, between 2.402 and 2.403 giga-Hertz.

Other embodiments hop between a pseudo-random succession of frequencies in a predetermined frequency range. The succession of frequencies is communicated to the slave transponders 12, 16 by the interrogator 10. The succession of frequencies and/or timing information for the hops may be security coded to maintain privacy using the pseudo-random frequency hopping scheme.

In both types of frequency hopping, the RF modules 18, 28, 30 filter out RF carrier frequencies that the interrogator 10 does not transmit. Each transponder 12, 16 is assigned a temporal sequence of RF carrier frequencies. The temporal sequences for the different RF modules 28, 30 differ so that the interrogator 10 can communicate with the transponders 12, 16 individually. The interrogator 10 transmits timing data that enables the RF modules 28, 30, to synchronize filtering with the assigned RF frequency hopping.

Figure 3:
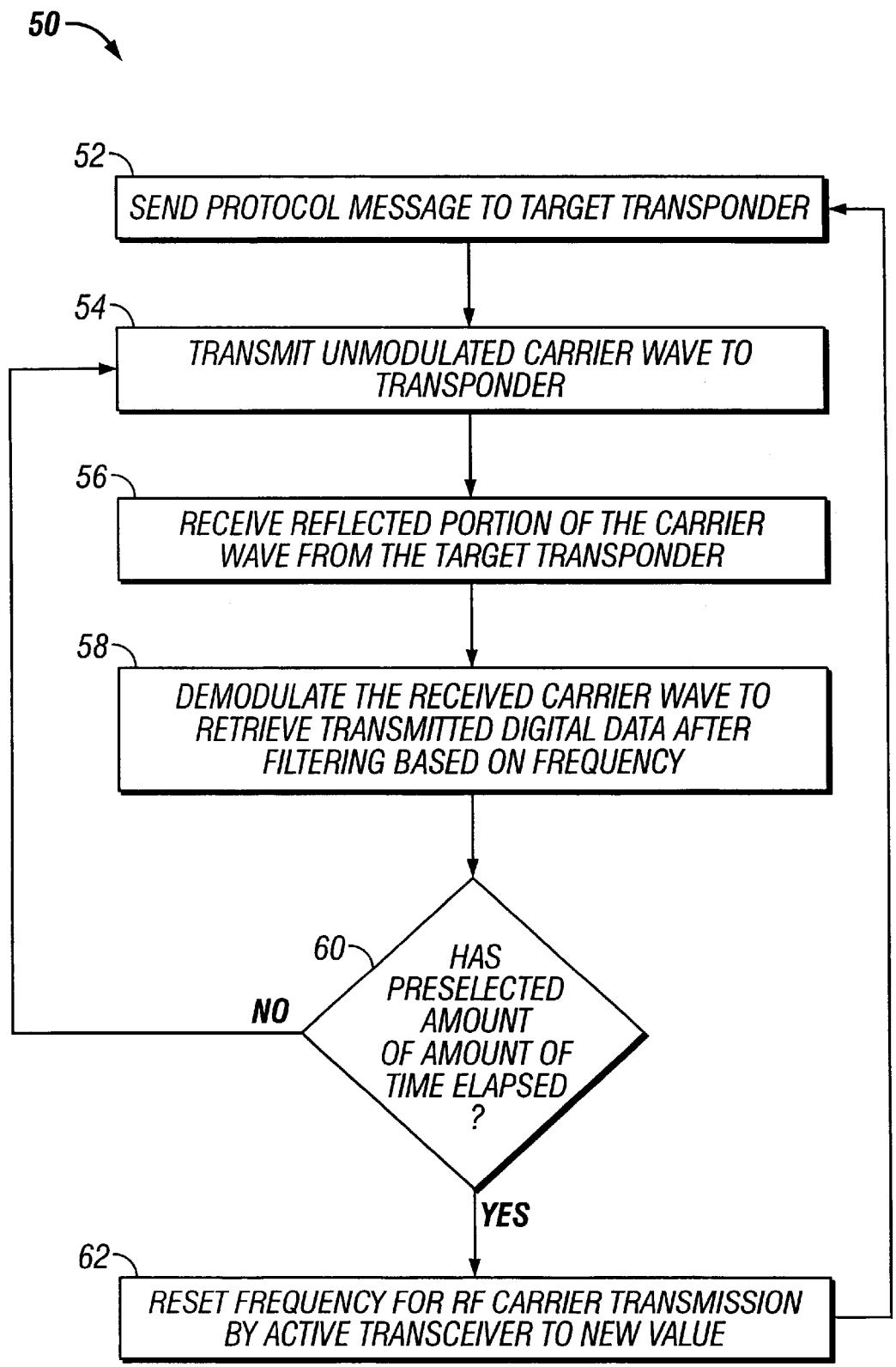
FIG. 3 shows a method by which an active transceiver receives data from transponders of the network of FIG. 2A.

FIG. 3 illustrates a wireless method 50 of receiving data transmissions from a passive transponder of a wireless network. For example, the transponders may be the transponders 12, 16 of the network 4 of FIGS. 1 and 2. An active transceiver sends an RF protocol message to a target transponder (step 52). In FIG. 2A, the active transceiver is the interrogator 10.

The protocol message sets up a protocol for subsequent data transmissions by the targeted transponder. The protocol message may contain transmission parameters that identify the targeted transponder and the calling active transceiver, the RF carrier frequency, frequency hopping data, encrypting codes, and timing data. While the protocol message is being sent, the active transceiver and the target transponder act like an ordinary wireless transmitter-receiver pair. The protocol message may also include data and/or queries to the target transponder that request responses.

After sending the protocol message, the active transceiver transmits an unmodulated RF carrier wave to the transponder via the wireless network (step 54). The transponder reflects the unmodulated RF carrier wave to produce a modulated RF wave carrying data back to the active transceiver. The active transceiver receives a portion of the RF carrier wave reflected back by the transponder (step 56). The active transceiver bandpass filters and demodulates the received RF carrier wave to retrieve digital data transmitted by the target transponder (step 58). The active transceiver determines whether a preselected time has elapsed (step 60). The preselected time period may be based on number of data packets or bytes received or on a counted time. If the preselected time has not elapsed, the transceiver continues to transmit the unmodulated carrier wave (step 54).

If the preselected time has elapsed, the active transceiver and target transponder reset their RF transmission frequencies to a new value, i.e., a frequency hop (step 62). After the frequency hop, the active transceiver transmits an RF carrier wave with the new frequency to the target transponder (step 54). In the illustrated embodiment, the active transceiver also transmits a new protocol message to the transponder prior to transmitting the new RF carrier wave (step 52). The new protocol message informs the target transponder of the new transmission frequency and/or other information. In some embodiments, several transmission cycles at different frequencies terminate before the transmission of a new protocol message.

Figure 4:
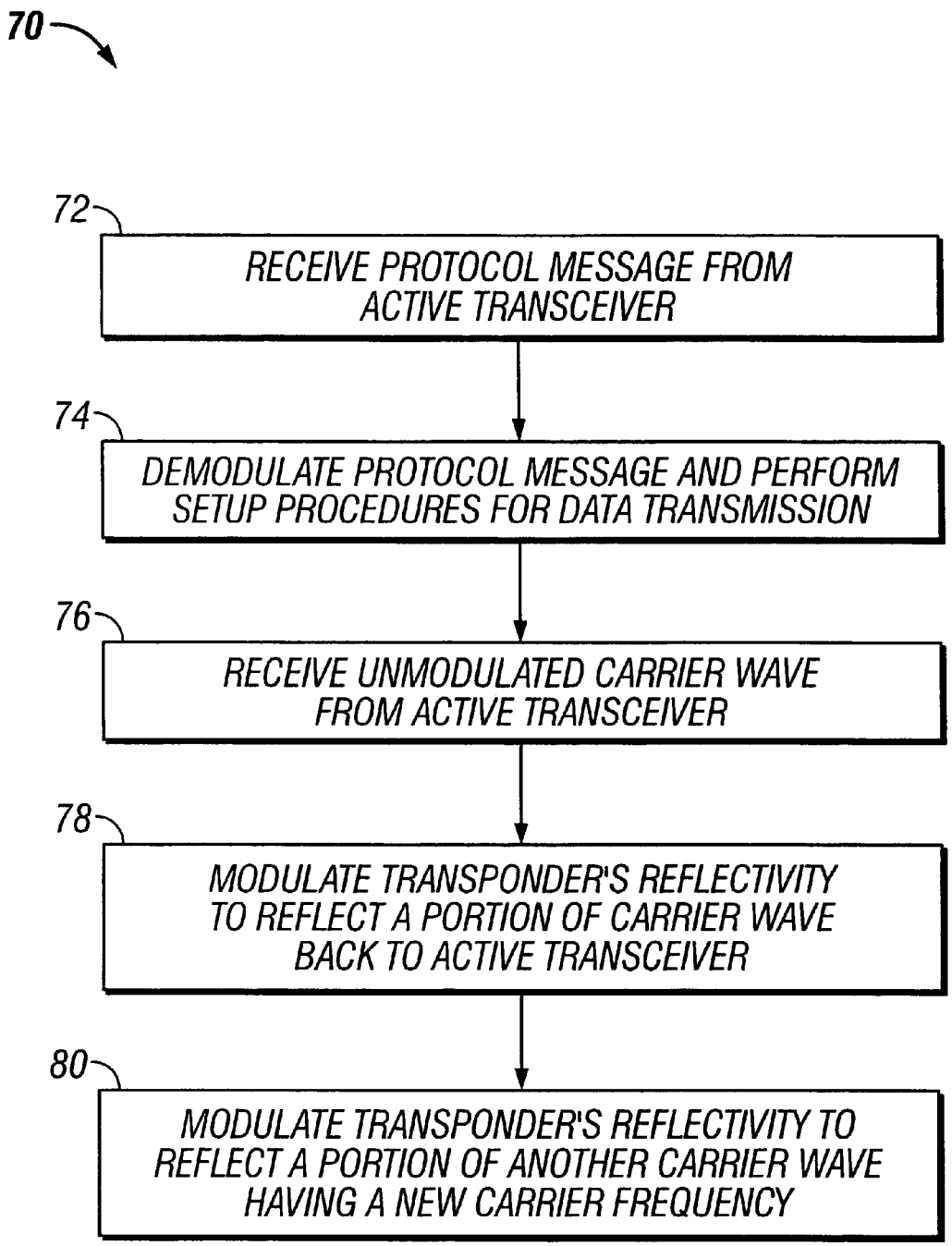
FIG. 4 shows a method by which a transponder transmits data to the active transceiver of FIGS. 2A–3.

FIG. 4 shows a method 70 by which a target transponder transmits digital data to the active transceiver. For example, the transponders and active transceiver may be the transponders 12, 16 and the interrogator 10 of FIG. 2A. The target transponder receives a protocol message from the active transceiver (step 72). The target transponder demodulates the received protocol message and performs setup procedures in response to data therein (step 74). For example, the setup procedures may include determining whether the transponder is the target of the protocol message. The setup procedures may also include setting a passband for frequency filtering and procedures to produce data requested by the active receiver. At a time determined by the protocol message, the transponder receives an unmodulated RF carrier wave from the active transceiver (step 76).

The target transponder modulates its own RF reflectivity between RF reflective and non-reflective states to reflect a portion of the RF carrier wave back to the active transceiver (step 78). The reflected portion of the RF carrier wave transmits data back to the active transceiver in the form of digital DPSK modulation. To modulate its RF reflectivity, the target transponder opens and closes the RF current loop formed by its receiving antenna 32, 34 as was described above. The target transponder again DPSK modulates its own reflectivity to reflect a portion of another RF carrier wave having a new carrier frequency (step 80). The reflected portion of the RF carrier wave at the new frequency transmits additional data back to the active transceiver. A portion of each reflected RF carrier wave is received and demodulated by the active transceiver to retrieve the transmitted data.

Other embodiments are within the scope of the following claims.

What is claimed is:

1. A wireless network comprising:
   an active transceiver to transmit a protocol message on a modulated carrier wave and to subsequently transmit carrier waves at a succession of preselected frequencies, wherein the protocol message includes data for the preselected frequencies; and
   a transponder to transmit digital data to the active transceiver by partially reflecting a first carrier wave having a first of the succession of preselected frequencies and to partially reflect a second carrier wave having a second of the succession of preselected frequencies prior to receiving a new protocol message from the active transceiver.

2. The wireless network of claim 1 wherein the active transceiver to transmit the carrier waves at radio frequencies.

3. The wireless network of claim 1, further comprising:
   a second transponder to transmit digital data to the active transceiver by partially reflecting carrier waves of a second succession, the active transceiver to transmit the second succession at preselected second frequencies.

4. The wireless network of claim 1, wherein the transponder comprises an antenna and a switch coupled to short a dipole.

5. The wireless network of claim 1, wherein the transponder comprises two antenna segments and a switch coupling the segments together linearly.

6. The wireless network of claim 4, wherein the switch is capable of opening and closing at a frequency of at least tens of kilo-Hertz.

7. The wireless network of claim 2, wherein the transceiver operates at frequencies between about 2.402 and 2.480 giga-Hertz.

8. The wireless network of claim 1, further comprising:
   a first device coupled to the active transceiver; and
   a second device selected from the group consisting of a cellular phone, pager, personal digital assistant, notebook computer, keyboard, and a computer mouse, the second device coupled to the transponder to provide data exchanges with the first device.

9. A transceiver for digital data, comprising:
   an antenna to transmit radio-frequency (RF) carrier waves; and
   a RF module coupled to drive the antenna to produce the RF carrier waves and to detect reflected portions of the produced RF carrier waves, the RF carrier waves having a succession of frequencies, the RF module further coupled to drive the antenna to produce a modulated carrier wave to transmit a first protocol message, the first protocol message including data for the succession of frequencies, the RF module further coupled to produce and detect carrier waves of at least two of the succession of frequencies prior to transmission of a second protocol message.

10. The transceiver of claim 9, wherein the RF module filters out received RF radiation at frequencies outside of a passband surrounding the frequencies driving the antenna.

11. The transceiver of claim 9, wherein the transceiver automatically hops to new transmission frequencies while transmitting the RF carrier waves.

12. The transceiver of claim 9, wherein the transceiver is configured to transmit and receive frequencies in compliance with protocols of the Bluetooth Special Interest Group.

13. The transceiver of claim 9, further comprising:
   one of a computer, a printer, and facsimile machine coupled to the RF module to receive digital transmissions received therein.

14. An apparatus, comprising:
   a transponder having an RF reflectivity, the transponder to receive a first protocol message including data for a succession of predetermined RF frequencies, the transponder further to modulate the RF reflectivity in response to receiving carrier waves having at least two of the succession of predetermined RF frequencies prior to receiving a second protocol message.

15. The apparatus of claim 14, wherein the transponder further comprises:

an RF antenna having the RF reflectivity;

a switch serially coupled across the antenna to form a circuit; and an RF module coupled to operate the switch to modulate the RF reflectivity.

16. The apparatus of claim 15, wherein the RF module is capable of receiving data transmissions on RF carrier waves.

17. The apparatus of claim 16, wherein the RF module transmits and receives frequencies complying with protocols of the Bluetooth Special Interest Group.

18. The apparatus of claim 15, further comprising:

one of a cellular phone, a pager, a personal digital assistant, a computer, a keyboard, and a computer mouse coupled to control the RF module.

19. The apparatus of claim 15, further comprising:

an identity badge coupled to control the RF module.

20. A method of wireless data transmission, comprising:

transmitting a first protocol message on a modulated radio-frequency (RF) carrier wave, the protocol message including data for a succession of frequencies for subsequent RF transmissions;

transmitting RF carrier waves to a transponder having at least two of the succession of frequencies; and receiving reflected portions of the RF carrier waves from the transponder, the reflected portions being digitally modulated;

transmitting a second protocol message on a modulated radio-frequency (RF) carrier wave, the protocol message including data for a second succession of frequencies for subsequent RF transmissions.

21. The method of claim 20, wherein the reflected portions have binary phase modulations.

22. The method of claim 20, wherein the receiving further comprises filtering out received RF radiation outside of passbands surrounding the frequencies.

23. The method of claim 20, further comprising:

demodulating the received portions of the reflected carrier waves to retrieve transmitted digital data.

24. A method of wireless digital communication, comprising:

receiving a protocol message at a receiver from an interrogator, the protocol message including data for a succession of frequencies for subsequent RF transmissions;

performing a setup procedure for data transmissions in response to receiving the protocol message;

receiving a first radio-frequency (RF) carrier wave from the interrogator;

digitally modulating an RF reflectivity of the receiver;

back reflecting a portion of the first RF carrier wave in response to the digitally modulating an RF reflectivity; and digitally modulating the RF reflectivity of the receiver to back reflect a second RF carrier wave having a new carrier frequency prior to receiving a new protocol message.

25. The method of claim 24, wherein the digitally modulating comprises:

electrically opening and closing a circuit, the circuit including a receiving antenna as a serial element.

26. The method of claim 26, wherein the electrically opening and closing includes modulating a conductivity of a transistor which forms a serial link in the circuit.

* * * * *